United States Patent [19]

Vees et al.

[11] Patent Number: 4,867,086
[45] Date of Patent: Sep. 19, 1989

[54] METHOD OF MAKING A DRY FIBER FORM AND COMPOSITES PREPARED THEREFROM

[75] Inventors: Frederick Vees, Minneapolis; Terrance Langston, Coon Rapids, both of Minn.

[73] Assignee: Xerkon, Inc., Minneapolis, Minn.

[21] Appl. No.: 222,531

[22] Filed: Jul. 21, 1988

[51] Int. Cl.⁴ .......................... D05B 1/00; B32B 7/08
[52] U.S. Cl. .................. 112/262.3; 112/403; 112/429; 428/102
[58] Field of Search ............... 112/262.3, 262.1, 265.1, 112/403, 429, 430, 441; 428/102, 105, 113, 285

[56] References Cited

U.S. PATENT DOCUMENTS

| | | | |
|---|---|---|---|
| 358,156 | 2/1887 | Juncker | 112/403 |
| 1,446,808 | 2/1923 | Moore | 112/429 |
| 2,309,498 | 1/1943 | Cavalluzzo | 112/429 X |
| 2,365,315 | 12/1944 | Williams | 112/403 X |
| 2,649,062 | 8/1953 | Nogler et al. | 112/429 X |
| 4,221,622 | 9/1980 | Slonina et al. | 112/403 X |
| 4,325,999 | 4/1982 | Chapman et al. | 428/112 |
| 4,401,495 | 8/1983 | McKinney | 428/113 X |
| 4,416,929 | 11/1983 | Krueger | 428/285 X |
| 4,681,049 | 7/1987 | Vees et al. | 112/262.3 |
| 4,786,343 | 11/1988 | Hertzberg | 428/102 X |

Primary Examiner—H. Hampton Hunter

[57] ABSTRACT

A dry fiber form, useful for the preparation of fiber/resin composites, is proposed by stitching a continuous tow of structural yarn to a substrate, according to a predetermined pattern. Numerous layers, similar or different to each other, are prepared, and adhered together. In one embodiment, the fibers are stitched to a removable substrate.

7 Claims, 1 Drawing Sheet

METHOD OF MAKING A DRY FIBER FORM AND COMPOSITES PREPARED THEREFROM

BACKGROUND OF THE INVENTION

1. Field of the Invention

This invention pertains to a method for making dry fiber forms for use in fiber/matrix resin composites, comprised of an oriented fiber reinforcement, and a resin matrix surrounding fibers, which is subsequently cured to a "set" degree. More particularly, this invention pertains to an improvement in the manufacture of fiber forms to be employed as the reinforcing fiber structure, particularly where said fiber form is of complex design.

2. Background of the Prior Art

Increasing emphasis has been placed on the identification of materials having enhanced physical properties similar to that of various steel and metal alloys, and yet, exhibiting a significant reduction in weight for equivalent strength, and improved chemical properties, such as corrosion resistance, and the like. One field of technology that appears to offer superior promise for the identification and provision of such materials is that concerned with articles exhibiting what is generally referred to as fiber/resin matrix composite construction. Such materials are comprised of fibers, yarns, threads or similar filamentary material, often of very high modulus, which are bound together in a matrix of a curable resin, either thermosetting or thermoplastic. The resulting composite has properties superior to either component, and in advanced forms, is characterized by the fact that the fibers or yarns exhibiting a high modulus are uniformly oriented, so as to carry and transmit load in specific directions.

A number of methods have been developed for the manufacture of these fiber/resin composites. Certain systems employ fibers which are "wetted" with a resin, either uncured or preliminarily staged, which is laid down in oriented fashion, usually on a substrate of some type. In order to make complicated shapes in three dimensions, it is frequently necessary to lay down a plurality of wet layers, and subsequently trim to final, precured dimensions. These operations are variously referred to as "prepreg" or "wet lay-up" methods of manufacture.

An alternative method of manufacture, which offers enhanced flexibility, and frequently gives a product of superior performance, involves the preliminary manufacture of a fiber form, that is, an integral article comprised entirely of fibers, generally held together by a variety of secondary holding means, such as additional stitch yarns, localized glue, etc., which ultimately correspond, in general shape, to the molded article. These fiber forms are infused or otherwise saturated with resin, and subsequently cured. U.S. Pat. No. 4,681,049 discloses a method of preparing such dry fiber forms wherein the fiber form, and the ultimate part, exhibit a curve, and where orientation of the fibers is desired such that the orientation is constant along the curve.

This process, and related processes, require the initial preparation of multiple layers of the oriented structural yarns, which are subsequently cut to shape. Quite frequently, the amount of material cut away is equal to or greater than the amount of material actually needed for the ultimate part. The trimmed excess is generally waste material. Such waste represents an economical loss regardless of the nature of the fibrous or filamentary material being used. When the reinforcing fiber is of a particular and specialized type, generally selected for superior modulus and related physical characteristics, the waste can represent a severe economic drain. The cost of materials such as Kevlar ® and the like, and the waste involved in preparation of composite articles incorporating those fibers, continue to help drive the cost of the overall article to a point where the article is only competitive with, and does not necessarily replace, its steel counterpart. It should be noted that, notwithstanding this fact, there is less waste involved in the dry fiber form process as described immediately above, than the prepreg or wet lay-up processes practiced as an alternative in the art.

Indeed, the waste involved in some applications renders these products questionable for certain applications. Specifically, where carbon/graphite fibers are required for their performance characteristics as the fibrous reinforcing medium, the significant amount of waste involved of what has been designated as a critical or sensitive material may preclude, or certainly render less desirable, the application of these methods, to the production of specific articles.

Accordingly, it remains a goal of the art to develop a process for the manufacture of oriented fiber/resin composites wherein the waste involved of the fiber reinforcing material is minimized. Because of the advantages derived therefrom, it would be advantageous to develop such a process in combination with the "dry" method, that is, the preparation of a dry fiber form, followed by application of a resin thereto, and curing. Such a method, however, would call for the preparation of near "net part" in fiber form production, that is, preparation of a fiber form with little or no waste.

SUMMARY OF THE INVENTION

A dry, non-resin impregnated fiber form is prepared by stitching, to a substrate, a continuous fiber tow, pulled from a source and stitched according to a predetermined pattern. The tow may be stitched in virtually any orientation within a single layer. After a first layer is completed, a second layer, of any conformation, may be stitched over the first, again, in any orientation. For subsequent layers, stitching penetrates directly through to the substrate, fixing all layers with respect to each other. Once the pattern has been completed, the substrate bearing the stitched layers is removed from the stitching apparatus, and the substrate is subsequently removed, by dissolving the substrate, burning it away, etc. Alternatively, the substrate may be incorporated and become an integral part of the fiber form and eventual composite.

A continuous fiber tow is stitched onto the substrate by apparatus generally employed for embroidery. A stitching head secures the continuous fiber tow by stitching a secondary fiber through the substrate and around the tow, penetrating the substrate on alternate sides of the tow as it advances. The substrate is held in a frame mounted on a pantographic support, capable of moving the substrate in any direction within two dimensions. Thus, to provide an initial layer of a rectangular shape, with an orientation of 45 degrees, the substrate is moved by the pantograph at an angle of 45 degrees with respect to stitching head, the movement being reversed when the tow reaches the outside perimeter of the designated rectangle. Of course, the same principal can be applied to a single layer of virtually any shape.

Subsequent layers, of identical or different dimension, can be stitched over the first layer, in similar fashion. The entire process is automated. The result is a fiber form, of a predetermined thickness, layer orientation and configuration, produced with virtually no waste.

The fiber form so produced is subsequently saturated with a resin and cured, through any of a number of processes. A preferred process combines the features of autoclaving and compression molding, and is disclosed in U.S. patent application Ser. No. 06/944,446, the entire content of which is incorporated herein by reference.

BRIEF DESCRIPTION OF THE DRAWINGS

In FIG. 2, the second layer is oriented at an angle of −45°.

DETAILED DESCRIPTION OF THE INVENTION

Figure 1:
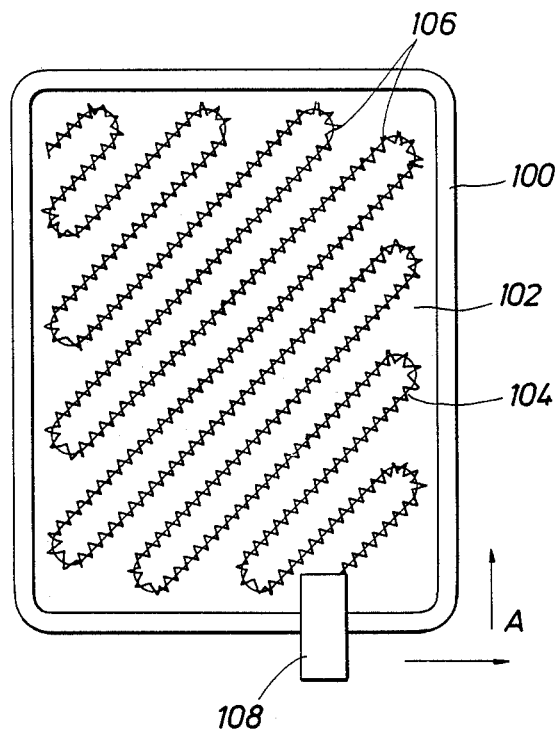
FIG. 1 is an illustration of the invention employed to stitch a first layer of continuous high modulus tow. The tow is oriented at an angle of 45°.
Figure 2:
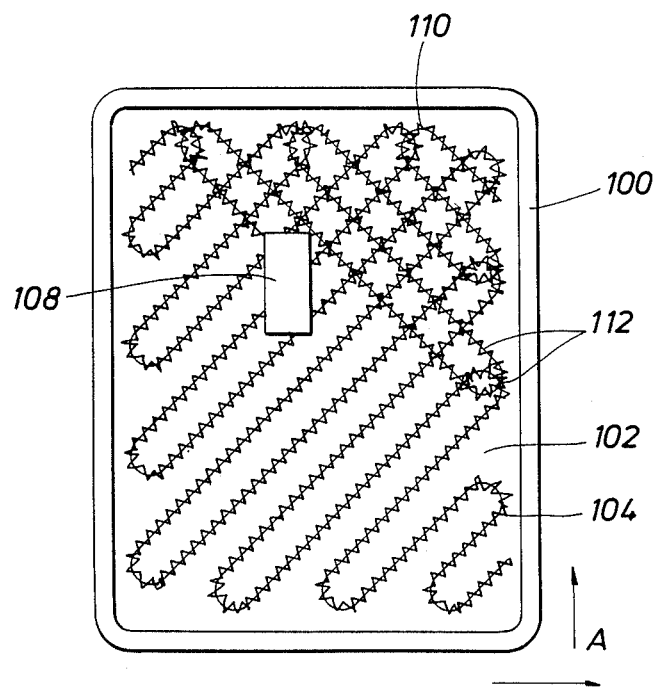
FIG. 2 is an illustration of the method of the invention, comprising application of a second layer on top of the first layer illustrated in FIG. 1.

Dry fiber forms can be best visualized as a plurality of layers, each generally defined by a two dimensional shape, and a single tow in thickness. The fiber tow may be of any high modulus material, and conventional materials include the various fiber glass materials, including E-glass and S-glass various synthetic fibrous materials such as Kevlar ® (a polyaramide) and other amide and aramide materials, such as nylon and the like, and even higher modulus materials, such as carbon and graphite fibers, and even metallic fibers, such as boron and the like. For the purposes of this application, the terms fiber, yarn and filamentary materials are generally used interchangeably. They may be monofilament, or aggregate, twisted or straight. In general, the term thread is used to designate secondary fibers, of generally lower modulus, used to maintain the orientation and pattern of the high modulus fibers. As a general rule of thumb, high modulus fibers exceed about 6,000,000 psi Youngs modulus, although exceptions such as nylon fibers may be noted.

In oriented fiber/resin composites, each layer of the composite, and therefore the fiber form, is oriented at a predetermined angle, the overall series of orientations being designed to give maximum strength in specific directions. Thus, one layer may have an orientation of zero degrees with respect to the axis to the article, which may not have a regular shape, while a layer thereover may have an angle of plus or minus 45 degrees, 30 degrees, or 90 degrees. Virtually any angle can be employed, depending on the directions in which strength and related properties are to be maximized.

To manufacture a fiber form of near net shape having a plurality of layers, each layer having a predetermined orientation, and each layer having a shape which may be regular or irregular, machinery generally employed for embroidery applications may be used. Currently available machinery includes machine obtained from Tajima, under the designation TMLE. An alternative machine, also capable of the same manufacture, may be obtained from Barudan under the designation BEAM. Other apparatus may be commercially available.

The basic requirements for the apparatus are that it include at least one stitching head 108, capable of securing ,a, continuous fiber tow 104 to a substrate 102, by stitching stitches 106 through the substrate on alternate sides of the tow, as the tow is moved relative to the substrate.

Actual movement of the tow relative to the substrate is most easily achieved by movement, of the substrate, which is mounted on a frame 100 which rests on a pantographic device. This could also be done by moving the stitching head. The pantograph is capable of automated movement according to a predetermined program, along any pattern in two dimensions. Thus, to prepare a single layer of a fiber form having an orientation of a given layer, the substrate is reciprocated back and forth along that given angle of orientation and simultaneously advance until the predetermined shape is completely filled in by the continuous tow stitched to the substrate.

After the first layer is completed, additional layers such as layer 110 may be stitched by stitches 112 directly onto the substrate, through the first layer, if desired. As, quite frequently, the total number of layers in a given fiber form may exceed 100, the ability to stitch up a plurality of layers on any given substrate becomes important in order to reduce the time necessary for manufacture. Generally, the number of layers that can be prepared together in any given stitching operation is limited by the height of the stitch needle, in particular, the distance between the stitch needle, and any guide means associated therewith, and the substrate itself. Currently, as many as sixteen layers, and perhaps up to twenty, can be adhered in any given single operation. As noted above, given a sufficient length, all layers for any given substrate will be prepared from a single continuous tow. The only exception to this will be when a first tow is exhausted, and the stitch pattern will then be interrupted, and resumed, with a second tow stitched in place.

In general, it is desirable to have the substrate easily penetrated, pliable, and light in weight, to make stitching as easy as possible. Moreover, most end uses require the composite to be relatively free of contaminating materials, other than the fibrous material and the resin itself. To this end, if the substrate is not prepared from identical fibrous materials, it may be necessary to remove it. One suitable substrate includes films or sheets of polyvinyllhl or other aqueous-soluble materials, which can be simply immersed in water after preparation, to dissolve away the substrate. Alternatively, depending on the nature of the fibrous material employed, a substrate which may be burnt away, such as ordinary craft paper and the like, may be employed. In a particularly preferred embodiment, it may be possible to use a substrate which can ultimately be incorporated in the molded composite. Thus, one contemplated substrate is a mat or skin of the fibrous material employed, whose basic requirement must be that it meets the fiber form design, and is capable of receiving and holding the stitch thread. Alternative substrate embodiments include sheets of resin, which may be subsequently melted to constitute all or part of the resin with which the fiber form is to be saturated, for curing. Again, these sheets must meet the physical demands of the apparatus and the process, that is, they must be able to withstand stitching, without excessive fraying, fracturing or the like, in order to preserve integrity of the substrate.

It should be noted that once the substrate is removed, if a nonpermanent substrate is employed, the remaining layers will be joined together by the successive stitching through layers into the substrate practiced in the formation step. Where only one or two layers are prepared on a given substrate, it may be necessary to pass an additional stitch-bond through the layers, to maintain their three dimensional positioning, however, alternative methods may be employed, including stitching the two or three layer fiber form fraction to another portion of the fiber form. As disclosed in U.S. patent application Ser. No. 156,937, all vertical stitch threads may be prepared from resin which melts or otherwise mixes with the resin matrix, upon molding. The entire disclosure of that application is incorporated herein by reference. Alternatively, conventional stitch yarns, such as polyester and the like, may be employed.

Once the fiber form is removed from the stitching apparatus, it is processed as desired to achieve a composite part. Thus, it is impregnated, saturated or otherwise put in intimate contact with a resin which is subsequently cured. Virtually any curable resin may be employed, and numerous conventional curing methods are available, such as autoclaving. A preferred curing method is disclosed in U.S. patent application 06/944,446, filed 12/22/86 which provides a process which involves placing the resin saturated article in a mold, drawing a vacuum on the mold, heating the mold and subsequently cooling the mold and removing the part.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method of manufacturing a dry fiber form comprised of layers of oriented structural yarn, said method comprising:
   stitching a continuous tow of said structural yarn to a substrate according to a predetermined pattern such that at least one said layer is formed on said substrate,
   removing said substrate from said formed layer, and attaching said formed layer to other similarly formed layers to provide said fiber form.

2. The method of claim 1, wherein said tow is stitched to said substrate by moving said substrate relative to said stitching desired in a fashion to form said layer.

3. The method of claim 2, wherein relative movement is achieved by movement of said substrate according to a predetermined pattern.

4. The method of claim 1, wherein said structural yarn is comprised of material selected from the group consisting of fiberglass, polyamide, polyaramide, carbon, graphite and mixtures thereof.

5. The method of claim 4, wherein said structural yarn is comprised of carbon or graphite-s.

6. The method of claim 1, wherein said substrate is soluble in solution, and is removed by dissolving it.

7. The method of claim 1, wherein said substrate is removed by pyrolisis.

* * * * *